US012570154B2

(12) United States Patent　　　　　(10) Patent No.:　US 12,570,154 B2
Chavrier et al.　　　　　　　　　　　　(45) Date of Patent:　Mar. 10, 2026

(54) SECURITY SYSTEM FOR A VEHICLE, VEHICLE COMPRISING SUCH A SECURITY SYSTEM AND ASSOCIATED SUPERVISION METHOD

(71) Applicant: VOLVO TRUCK CORPORATION, Gothenburg (SE)

(72) Inventors: Philemon Chavrier, Lyons (FR); Renaud Laperriere, Lyons (FR); Cedric Mazaufroy, Miribel (FR); François Berny, Saint-Cyr-sur-Menthon (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 101 days.

(21) Appl. No.: 18/403,877

(22) Filed: Jan. 4, 2024

(65) Prior Publication Data

US 2024/0227567 A1　　　Jul. 11, 2024

(30) Foreign Application Priority Data

Jan. 10, 2023　　(EP) ..................................... 23150890

(51) Int. Cl.
　　　*B60L 3/00*　　　　　(2019.01)
　　　*B60L 3/04*　　　　　(2006.01)
　　　(Continued)

(52) U.S. Cl.
　　　CPC ............ *B60L 3/04* (2013.01); *B60R 25/1018* (2013.01); *B60R 25/20* (2013.01)

(58) Field of Classification Search
　　　CPC .......... B60L 3/04; B60L 3/00; B60R 25/1018; B60R 25/20; B60R 16/03; B60R 16/0232; H02J 7/0031; H01H 9/167
　　　(Continued)

(56) References Cited

U.S. PATENT DOCUMENTS 10,958,265　B1 *　3/2021　Sullivan ................. B66D 1/485
2011/0057596　A1 *　3/2011　Kagoshima ........... B60L 3/0061
　　　　　　　　　　　　　　　　　　　318/490
(Continued)

FOREIGN PATENT DOCUMENTS

EP　　　　2309637　A2　4/2011
EP　　　　2309637　A3　2/2012
(Continued)

OTHER PUBLICATIONS

European Search Report in corresponding European Application No. 23150890.4 dated Jun. 14, 2023 (2 pages).

*Primary Examiner* — Shardul D Patel

(74) *Attorney, Agent, or Firm* — Jeffri A. Kaminski; Venable LLP

(57)　　　　　　　　ABSTRACT

A security system circuit for a vehicle includes an electronic main control unit, at least one electronically operated switch, which is arranged on an input line of an electric load of the vehicle. Each electronically operated switch is controlled by the main control unit and is configured to switch between a connected configuration. The electronically operated switch allows electricity to flow through the input line between a main electric power source of the vehicle and the electric load, and a cutoff configuration, where said electronically operated switch prevents electricity from circulating through the input line between the main power source and said electric load, a safety switch, configured to be activated by a user of the vehicle. The safety switch is configured to control the main control unit, so that each electronically operated switch switches to its cutoff configuration when the safety switch is activated.

11 Claims, 3 Drawing Sheets

(51) Int. Cl.
  *B60R 25/10*    (2013.01)
  *B60R 25/20*    (2013.01)
(58) Field of Classification Search
  USPC ........................................................... 701/22
  See application file for complete search history.

(56)              References Cited

U.S. PATENT DOCUMENTS

2020/0207288 A1\*   7/2020   Murazumi ................ H02J 7/00
2021/0143663 A1\*   5/2021   Bolton ................ H01M 10/443

FOREIGN PATENT DOCUMENTS

EP          3663137  A1    6/2020
WO        2004078527  A1    9/2004

\* cited by examiner

SECURITY SYSTEM FOR A VEHICLE, VEHICLE COMPRISING SUCH A SECURITY SYSTEM AND ASSOCIATED SUPERVISION METHOD

TECHNICAL FIELD

The invention relates generally to the safety of vehicles for road transportation of dangerous goods. In particular aspects, the invention relates to a security system for a vehicle and to a vehicle comprising such a safety circuit. The invention also relates to a supervision method for a vehicle. The invention can be applied in heavy-duty vehicles, such as trucks, buses, and construction equipment. Although the invention may be described with respect to a particular vehicle, the invention is not restricted to any particular vehicle.

BACKGROUND

ADR regulations concerns the road transportation of hazardous goods. ADR is an acronym for the expression—originally in French—"Agreement concerning the International Carriage of Dangerous Goods by Road". The aim of ADR regulations is to ensure the safety of the driver and operators when the hazardous material are being loaded or unloaded or hazardous operation are done near the truck.

Under ADR regulations, a vehicle—usually a truck—carrying hazardous materials must be equipped with a safety switch, which must be triggered by the driver or by an operator around the vehicle, for any activity involving hazardous materials, such as loading/unloading of hazardous material, presence of explosives materials, etc. ADR regulations states that as soon as the safety switch is triggered, any electric equipment or accessory of the vehicle, more generally any electric load of the vehicle, shall be cut off from its electric power supply within 200 milliseconds. Document EP 3 663 137-A1 describes, for example, a battery isolating device that comprises two electronically operated switches, each arranged on a supply line connected to a respective pole, plus or minus, of the battery, in order to reduce discharge of the battery when the vehicle is parked for a long period of time.

However, when a truck comprises additional power sources such as, for example, a solar panel, an additional battery or a capacitor, such additional power source might continue to provide electric power to an accessory, for example in case of defect or wrong usage, which could lead to dangerous, potentially life threatening, situations. To this end, the invention aims at providing a security system circuit for a vehicle, which provides improved safety.

SUMMARY

According to a first aspect of the invention, the invention relates to a security system circuit for a vehicle, the security system comprising an electronic main control unit, and at least one electronically operated switch, which is arranged on an input line of an electric load of the vehicle, each electronically operated switch being controlled by the main control unit and being configured to switch between a connected configuration, where said electronically operated switch allows electricity to flow through the input line between a main electric power source of the vehicle and the electric load, and a cutoff configuration, where said electronically operated switch prevents electricity from circulating through the input line between the main power source and said electric load. The security system also comprises a safety switch, configured to be activated by a user of the vehicle, the safety switch being configured to control the main control unit, so that each electronically operated switch switches to its cutoff configuration when the safety switch is activated. The security system further comprises an electronic safety control unit, which is different from the main control unit, the safety control unit being powered by the main power source, at least one current sensor, each current sensor being configured to detect electric current flowing through a respective input line of said electric load, and alarm means, configured to alert a user of the vehicle. The safety control unit is configured to change from a waiting mode to an active mode under the control of a main control unit of the vehicle, which is different from the safety control unit, the safety control unit changing to the active mode when the safety switch is activated, and to activate the alarm means when the safety control unit is in the active mode, and after a predetermined first time interval from the moment the safety switch is activated, at least one current sensor detects electric current flowing through the corresponding input line.

A technical benefit may include alerting the user(s) in and/or around the vehicle in case of the electric load still uses electric power despite the safety switch being triggered. The safety of the truck is therefore improved.

In some examples, after the safety control unit activates the alarm means, the safety control unit turns off the alarm means after a predetermined second time interval. A technical benefit may include alerting the user of a potential malfunction of the main control unit without startling the user.

In some examples, the second time interval ends 200 ms after the safety switch is activated. A technical benefit may include fulfilling ADR regulation for the safety system itself.

In some examples, first time interval is equal to 50 ms after the safety switch is activated. A technical benefit may include allowing the transient electrical phenomenon occurring after the opening of each electronically operated switch, to end, in order to avoid false alarms.

In some examples, the at least one electronically operated switch includes an additional electronically operated switch, whereas the power supply of the safety control unit is controlled by the main control unit through the additional electronically operated switch, and whereas the main control unit is configured to switch said additional electronically operated switch in its cutoff configuration after a predetermined time interval after the safety switch is activated. A technical benefit may include improving the overall safety by including the safety control unit in its own supervision.

A second aspect of the invention concerns a road vehicle, in particular a truck, comprising the security system as previously described, a main power source, for example a battery, and one electric load with at a first input line, which is connected to the main power source, whereas the at least one current sensor include a first sensor, which is arranged on the first input line.

A technical benefit may include having a vehicle with improved safety when handling dangerous goods.

In some examples, the road vehicle comprises an additional power source, for example a capacitor or a solar panel, the additional power source being different from the main power source, the electric load comprises a second input line, which is different from the first input line and which is connected to the additional power source, whereas the at least one current sensor include a second sensor, which is arranged on the second input line. A technical benefit may include improving the safety of road vehicles comprising additional power sources.

A third aspect of the invention concerns a supervision method to supervise electric accessories of a vehicle comprising the security system previously described, the supervision method comprising the following steps:

after the safety switch is activated, obtaining information, from at least one current sensor that is arranged on a respective input line, regarding current flowing through the corresponding input line, activating the alarm means if, after the predetermined first time interval from the moment the safety switch is activated, at least one current sensor detects electric current flowing through the corresponding input line.

A technical benefit may include the same advantages as those mentioned above for the security system of the invention.

In some examples, the supervision method comprises the following additional steps: after activating the alarm means, turning off alarm the means after a predetermined second time interval.

A technical benefit may include alerting the user of a potential malfunction of the main control unit without startling the user.

In some examples, the second time interval ends 200 ms after the safety switch is activated. A technical benefit may include ensuring that the alarm means themselves fulfill ADR regulations.

In some examples, the first time interval is equal to 50 ms. A technical benefit may include allowing the transient electrical phenomenon occurring after the opening of each electronically operated switch, to end, in order to avoid false alarms.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the invention as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the invention cited as examples.

DETAILED DESCRIPTION

Aspects set forth below represent the necessary information to enable those skilled in the art to practice the invention.

Figure 1:
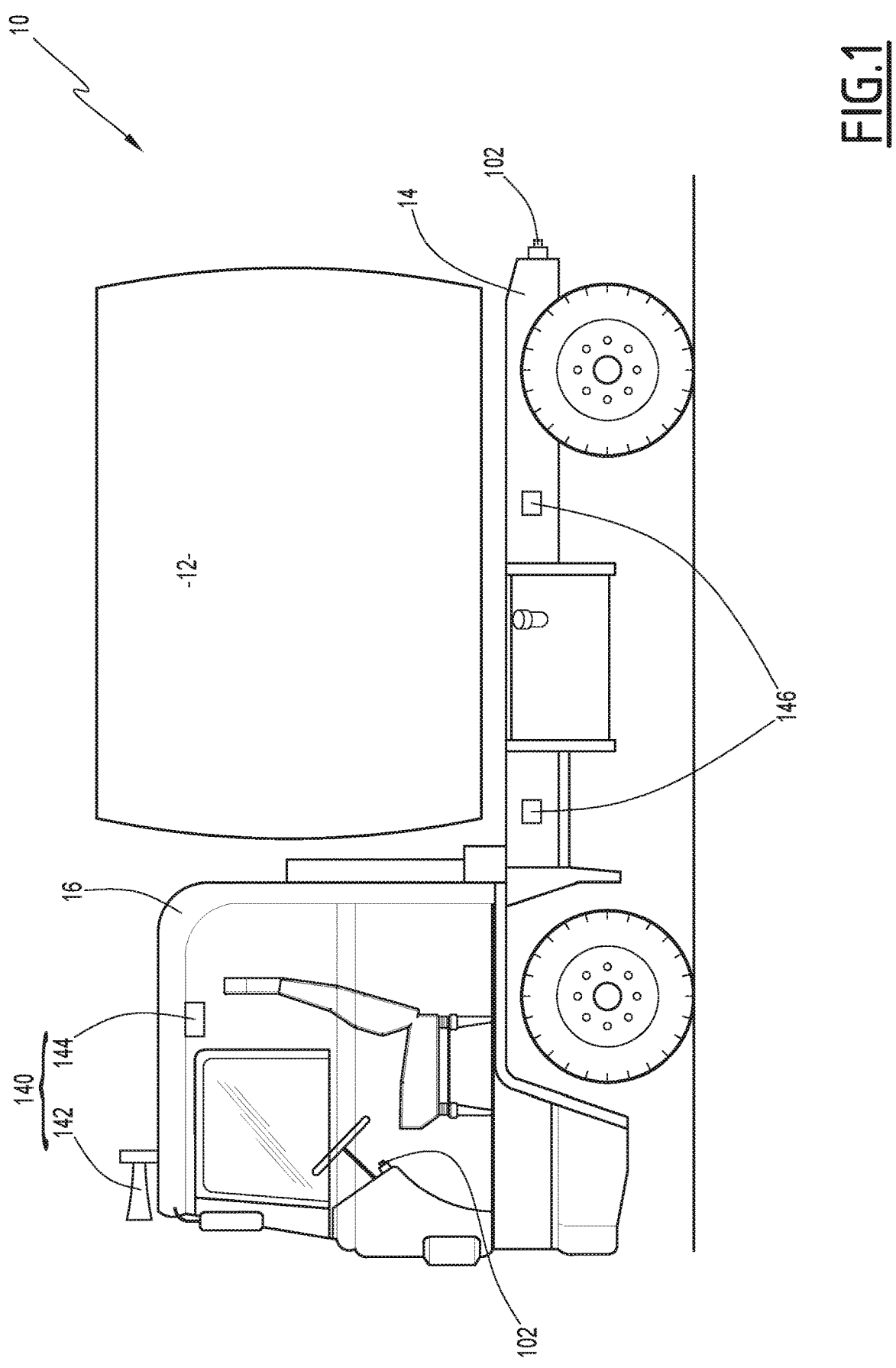
FIG. 1 is an exemplary vehicle, which comprises a security system according to the invention.

FIG. 1 is an exemplary vehicle 10 according to an embodiment of the invention. The vehicle 10 is a road vehicle and is configured to carry goods that fall under the ADR definition, in other words dangerous goods. In the illustrated example, the vehicle 10 is represented by a cistern truck and comprises a cistern 12, which is arranged on top of a chassis 14. Of course, the type of vehicle 10 may vary, depending on the type of dangerous goods to be transported. The vehicle 10 also comprises a cabin 16 for a driver of the vehicle 10.

Figure 2:
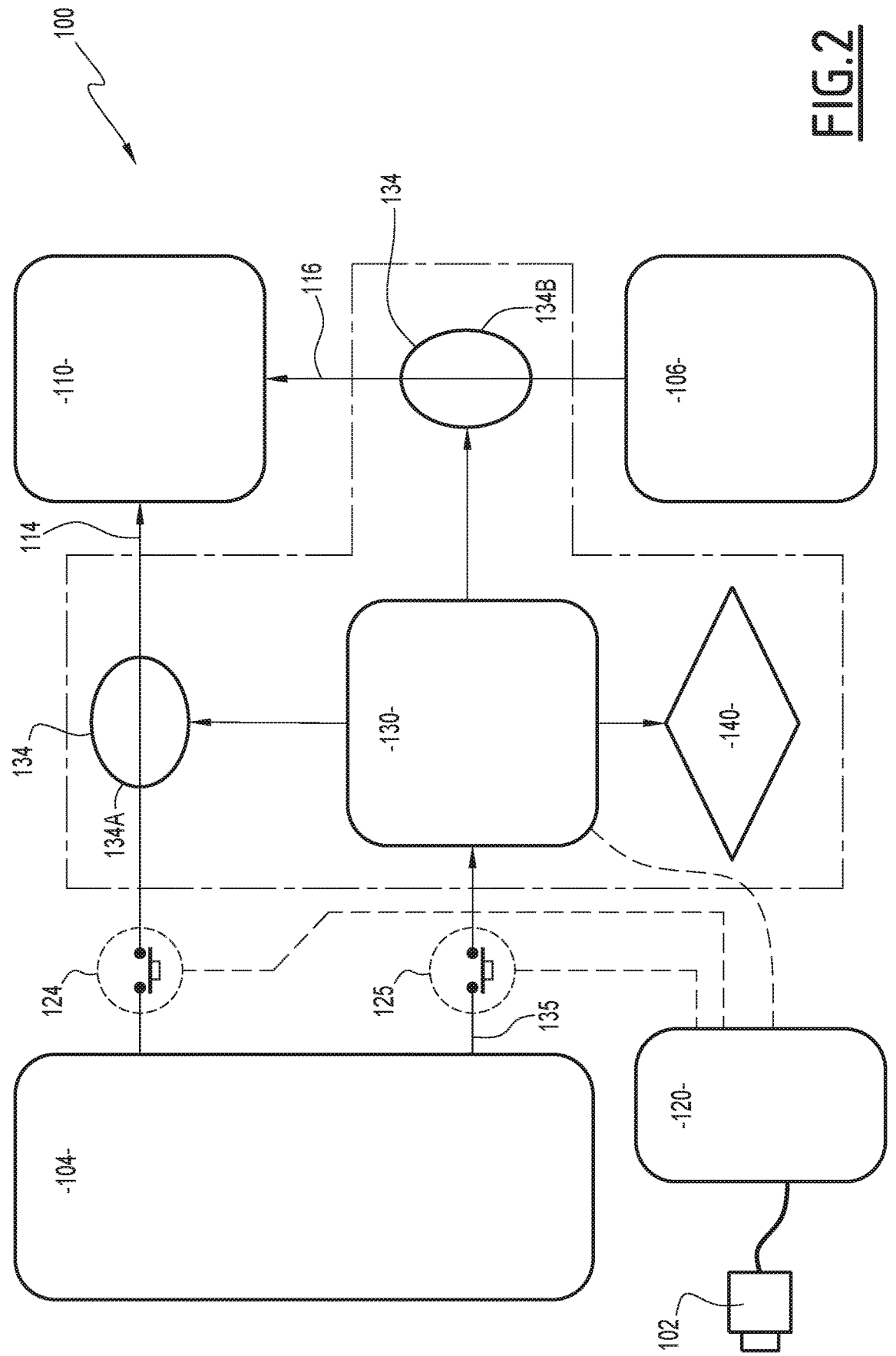
FIG. 2 is a schematic representation of the security system of FIG. 1.

The vehicle 10 comprises a security system 100, which is represented schematically on FIG. 2. The security system 100 comprises at least one safety switch 102. Each safety switch 102 is configured to be activated by a user of the vehicle 10 when needed. In the illustrated example, the vehicle 10 comprises two safety switches 102, with a first safety switch 102 arranged inside the cabin 16, here on a dashboard 18, and a second safety switch 102 arranged outside the cabin 16. In the illustrated example, the second safety switch 102 is arranged on the chassis 14 at a rear end of the vehicle 10. In the illustrated example, the safety switches 102 are represented by pushbuttons. The number, location and shape of the safety switches 102 are not limitative.

The vehicle 10 comprises a main power source 104, for example a battery such as an acid-lead battery. The main power source 104 is configured to store electric power, and to release, when needed, electric power. The vehicle 10 also comprises a secondary power source 106, which is different from the main power source 104. For example, the secondary power source 106 is a lithium-ion battery, which is configured to harvest electric energy generated while braking, or a solar panel, etc.

The vehicle 10 also comprises an electric load 110. According to non-limiting examples, the electric load 110 is a pump, a compressor, a cooling system, etc. More generally, the electric load 110 is a piece of equipment that is powered by electricity. The electric load 110 comprises a first input line 114, which is connected to the main power source 104. The first input line 114 is represented by a line on FIG. 2, with an arrow illustrating the flow of electric power, from the main power source 104 to the electric load 110. The electric load 110 also comprises a second input line 116, which is different from the first input line 114 and which is connected to the secondary power source 106.

The security system 100 also comprises an electronic main control unit 120 and a first electronically operated switch 124. The first electronically operated switch 124 is arranged on the first input line 104, that is to say between the main power source 104 and the electric load 110. The electronically operated switch 124 is controlled by the main control unit 120 and is configured to switch between a connected configuration, where said electronically operated switch 124 allows electric current to flow between the main power source 104 and the electric load 110, and a cutoff configuration, where the electronically operated switch 124 prevents electric current from circulating between the main power source 104 and the electric load 110. The electronically operated switch 124 is schematically represented on FIG. 2. Preferably, the electronically operated switch 124 is a solid-state relay, for example a thyristor, which is controlled by the main control unit 120.

The main control unit 120 is controlled by the safety switch 102, so that the electronically operated switch 124 switches to its cutoff configuration when the safety switch 102 is activated. According to some examples, each safety switch 102 is connected to the main control unit 120 through a data bus of the vehicle 10, such as a CAN bus. The data bus is not represented. More generally, any connection for data transmission may be done through a data bus of the vehicle, such as a CAN bus, while connection for electric power transmission are preferably done through dedicated electric wires.

The security system 100 also comprises an electronic safety control unit 130. The safety control unit 130 is different from the main control unit 120. The safety control unit 130 is powered by the main power source 104 through a supply line 135.

Preferably, the supply line 135 of the safety control unit 130 is controlled by the main control unit 120 through an additional electronically operated switch 125. The additional electronically operated switch is similar, preferably identical, to the other electronically operated switch(s) 124 associated to the electric load(s) 110. The additional electronically operated switch 125 is controlled by the main control unit 120, more precisely the main control unit 120 is configured to switch said additional electronically operated switch 125 in its cutoff configuration after a predetermined time interval after the safety switch is activated.

The security system 100 also comprises at least one current sensor 134, including a first sensor 134A. In the illustrated example, the first sensor 134A is arranged on the first input and is schematically represented by a loop around the first input line 114. The safety control unit 130 is configured to receive data from each current sensor 134, for example data representing the intensity of an electric current measured by the sensor 134, or data representing whether an electric current is actually circulating or not. In a not shown alternative, the current sensor 134A is integrated with the electronically operated switch 124 associated with the first input line 114. In another, not shown, alternative, the additional electronically operated switch 125 also integrates an additional current sensor.

The at least one current sensor 134 advantageously includes a second sensor 134B, which is different from the first sensor 134A and which is arranged on the second input line 116. The second sensor 134B is configured to detect electric current circulating through the second input line 116. More generally, each current sensor 134 is arranged on a respective input line or supply line, each current sensor 134 being configured to detect electric current circulating through the corresponding line.

The security system 100 also comprises alarm means 140. The alarm means 140 are configured to alert a user of the vehicle 10, in particular when said user presses one of the safety switches 102. In the illustrated example, the alarm means 140 include a horn 142, arranged on the top of the cabin 16, a buzzer 144 arranged inside the cabin, and lights 146 arranged on the chassis 14. The number, location and types of alarm means 140 is not limitative.

Working principles of the security system 100 are detailed hereinafter.

During normal operations of the vehicle 10, the safety switches 102 are in a deactivated configuration, while the safety control unit 130 is in a first mode, for example a waiting mode. The alarm means 140 are not activated, and the electronically operated switches 124 and 125 are in their connected configuration.

Advantageously, when the safety control unit 130 is in the waiting mode, the safety control unit 130 monitors the data received from each current sensors 134. In case of an abnormal situation, for example if the current value measured by any one of the current sensors 134 rises above a predetermined threshold, then the safety control unit 130 alerts a user of the vehicle 10. For example, the safety control unit 130 activates the alarm means 140 in a specific way to alert the user without startling the user—especially if the user is driving.

When needed, for example when loading the vehicle 10 with dangerous goods, or in case of an abnormal situation, a user triggers one of the safety switches 102. As one of the safety switches 102 is triggered, the main control unit 120 switches the electronically operated switch 124 to its cutoff configuration, in order to disconnect the electric load 110 from the main power source 104. When the vehicle 10 comprises several electric loads 110, each associated with a respective electronically operated switch 124, then the main control unit 120 switches each electronically operated switch 124 to its cutoff configuration.

Also, when one of the safety switches 102 is activated, the main control unit 120 activates the safety control unit 130 to an active mode. When in the active mode, the safety control unit 130 receives data from each current sensor 134.

If, after a predetermined first time interval from the moment the safety switch 102 is activated, any one of the current sensors 134 detects an electric current flowing through the input line 114, then the safety control unit 130 activates the alarm means 140, in order to alert the user that the electric load 110 is not properly deactivated. An electric current flowing through the input line 114 means that a current above a predetermined current threshold is circulating in said input line. For example, the predetermined current threshold is proportional to a sensitivity threshold of the current sensor 134.

When the security system 100 works properly, the first time interval is set to allow transient electrical phenomenon to disappear after each electronically operated switch 124 is switched to its cutoff configuration, in order to avoid false alarms. For example, the first time interval is equal to 50 ms—milliseconds—after the safety switch 102 is activated.

Advantageously, after the safety control unit 130 activates the alarm means 140, the safety control unit 130 turns off the alarm means 140 after a predetermined second time interval. Preferably, the second time interval ends 200 ms—milliseconds—after the safety switch 102 is activated, in order to fulfill ADR regulations.

Similarly, the safety control unit 130 itself is also an electric equipment of the vehicle 10, and as such the safety control unit 130 itself should fulfill ADR regulations. Preferably, when the safety switch 102 is activated, the main control unit 120 is configured to switch the additional electronically operated switch 125 in its cutoff configuration after a predetermined third time interval after the safety switch 102 is activated, so that the safety control unit 130 itself is turned-off. Preferably, the third time interval is shorter than 200 ms, for example equal to 180 ms.

Advantageously, the safety control unit 130 comprises a timer, configured to count the elapsed time after the safety control unit 130 is switched to its active configuration until the safety control unit 130 itself is turned off. If the elapsed time exceeds the third time interval, meaning that the main control unit 120 did not properly switch the additional electronically operated switch 125 to its cutoff configuration, then the safety control unit 130 activates the alarm means 140.

Based on the example of the security system 100 described above, the invention also concerns a supervision method to supervise the electric loads of the vehicle 10. This supervision method is preferably implemented using the safety control unit 130 previously described.

Figure 3:
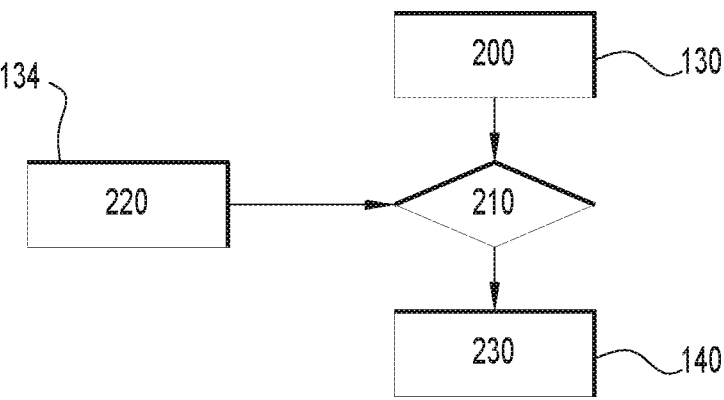
FIG. 3 is an exemplary system diagram of a supervision method implemented with the security system of FIG. 1.

With reference to FIG. 3, the safety control unit 130 is initially in the waiting mode. Waiting mode is represented by a box 200. If the safety switch 102 is activated, then the safety control unit 130 switches to the activated mode. Activated mode is represented by a box 210. While in the activated mode 210, the safety control unit 130 receives data from the current sensors 134. Reception of data is represented by a box 220.

If, after the predetermined first time interval from the moment the safety switch 102 is activated, data received from the current sensors 134 show that at least one current sensor 134 detects electric current flowing through the corresponding input line, then the safety control unit 130 activates the alarm means 140. Activation of the alarm means 140 is represented by a box 230.

The first time interval is longer that 10 ms, preferably longer that 20 ms, even more preferably longer than 40 ms. For example, the first time interval is equal to 50 ms.

Advantageously, after the safety control unit 130 activates the alarm means 140, the safety control unit 130 turns off the alarm means 140 after a predetermined second time interval. The second time interval ends preferably 200 ms after the safety switch is activated.

Advantageously, when the safety control unit 130 is in the active configuration, the safety control unit 130 starts a timer, to count time elapsed since the safety control unit 130 is switched to its active mode, until the power supply of the safety control unit 130 is cut-off by the additional electronically operated switch 125, in other words until the safety control unit 130 is turned off. If the elapsed time reaches the predetermined third time interval, then the safety control unit 130 activates the alarm means 140. Preferably, the third time interval is shorter than 200 ms.

The terminology used herein is for the purpose of describing particular aspects only and is not intended to be limiting of the invention. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present invention.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present invention is not limited to the aspects described above and illustrated in the drawings; rather, the skilled person will recognize that many changes and modifications may be made within the scope of the present invention and appended claims. In the drawings and specification, there have been disclosed aspects for purposes of illustration only and not for purposes of limitation, the scope of the inventive concepts being set forth in the following claims.

What is claimed is:

1. A security system circuit for a vehicle, the security system comprising:
   an electronic main control unit,
   at least one electronically operated switch, which is arranged on an input line of an electric load of the vehicle, each electronically operated switch being controlled by the main control unit and being configured to switch between:
   a connected configuration, where said electronically operated switch allows electricity to flow through the input line between a main electric power source of the vehicle and the electric load, and
   a cutoff configuration, where said electronically operated switch prevents electricity from circulating through the input line between the main power source and said electric load,
   a safety switch, configured to be activated by a user of the vehicle, the safety switch being configured to control the main control unit, so that each electronically operated switch switches to its cutoff configuration when the safety switch is activated,
   wherein the security system further comprises:
   an electronic safety control unit, which is different from the main control unit, the safety control unit being powered by the main power source,
   at least one current sensor, the at least one current sensor being configured to detect electric current flowing through a respective input line of said electric load, and
   an alarm, configured to alert a user of the vehicle,
   wherein the safety control unit is configured:
   to change from a waiting mode to an active mode under the control of the main control unit of the vehicle, the safety control unit changing to the active mode when the safety switch is activated, and
   to activate the alarm when:
   the safety control unit is in the active mode, and
   after a predetermined first time interval from the moment the safety switch is activated, at least one current sensor detects electric current flowing through the corresponding input line.

2. The security system according to claim 1, wherein: after the safety control unit activates the alarm, the safety control unit turns off the alarm after a predetermined second time interval.

3. The security system according to claim 2, wherein: the second time interval ends 200 ms after the safety switch is activated.

4. The security system according to claim 1, wherein:
first time interval is equal to 50 ms after the safety switch
  is activated.

5. The security system according to claim 1, wherein:
the at least one electronically operated switch includes an
  additional electronically operated switch,
the power supply of the safety control unit is controlled by
  the main control unit through the additional electroni-
  cally operated switch,
the main control unit is configured to switch said addi-
  tional electronically operated switch in its cutoff con-
  figuration after a predetermined time interval after the
  safety switch is activated.

6. A road vehicle, comprising:
the security system according to claim 1,
a main power source,
one electric load with at a first input line, which is
  connected to the main power source, wherein the at
  least one current sensor include a first sensor, which is
  arranged on the first input line.

7. A road vehicle according to claim 6, wherein:
the vehicle comprises an additional power source, for
  example a capacitor or a solar panel, the additional
  power source being different from the main power
  source,
the electric load comprises a second input line, which is
  different from the first input line and which is con-
  nected to the additional power source, wherein the at least one current sensor include a second
  sensor, which is arranged on the second input line.

8. A supervision method to supervise electric accessories
of a vehicle comprising the security system according to
claim 1, the supervision method comprising the following
steps:
  after the safety switch is activated, obtaining information,
    from at least one current sensor that is arranged on a
    respective input line, regarding current flowing through
    the corresponding input line,
  activating the alarm if, after the predetermined first time
    interval from the moment the safety switch is activated,
    at least one current sensor detects electric current
    flowing through the corresponding input line.

9. The supervision method according to claim 8, com-
prising the following additional steps:
  after activating the alarm means, turning off the alarm
    means after a predetermined second time interval.

10. The supervision method according to claim 9,
wherein:
  the second time interval ends 200 ms after the safety
    switch is activated.

11. The supervision method according to claim 8,
wherein:
  the first time interval is equal to 50 ms.

* * * * *